United States Patent
Wong et al.

(10) Patent No.: US 10,317,960 B2
(45) Date of Patent: Jun. 11, 2019

(54) PASSIVE RADIATOR COOLING FOR ELECTRONIC DEVICES

(71) Applicant: Intel Corporation, Santa Clara, CA (US)

(72) Inventors: Hong W. Wong, Portland, OR (US); Yanbing Sun, Shanghai (CN); Shaorong Zhou, Shanghai (CN); Xiaoguo Liang, Shanghai (CN); Wah Yiu Kwong, Hillsboro, OR (US); Cheong W. Wong, Beaverton, OR (US); Jiancheng Tao, Shanghai (CN); Prosenjit Ghosh, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/324,040

(22) PCT Filed: Sep. 28, 2014

(86) PCT No.: PCT/CN2014/087671
§ 371 (c)(1),
(2) Date: Jan. 5, 2017

(87) PCT Pub. No.: WO2016/045120
PCT Pub. Date: Mar. 31, 2016

(65) Prior Publication Data
US 2017/0205858 A1     Jul. 20, 2017

(51) Int. Cl.
*G06F 1/16*      (2006.01)
*G06F 1/20*      (2006.01)
(Continued)

(52) U.S. Cl.
CPC ............ *G06F 1/203* (2013.01); *G06F 1/1626* (2013.01); *H04R 1/2834* (2013.01); *F04D 33/00* (2013.01);
(Continued)

(58) Field of Classification Search
CPC .......... G06F 1/181–1/182; G06F 1/203; G06F 1/206; G06F 1/20; G06F 1/1626;
(Continued)

(56) References Cited

U.S. PATENT DOCUMENTS 5,552,636 A *   9/1996   Darveaux ............... H01L 23/32
                                                                                              257/709
6,400,563 B1 *   6/2002   Mohi ..................... G06F 1/1616
                                                                                               165/122

(Continued)

FOREIGN PATENT DOCUMENTS

CN        2479259 Y     2/2002
WO    2016045120 A1    3/2016

OTHER PUBLICATIONS

International Search Report and Written Opinion received for International Application No. PCT/CN2014/087671, dated Feb. 6, 2015, 11 pages.
(Continued)

*Primary Examiner* — Robert J Hoffberg
*Assistant Examiner* — Razmeen Gafur
(74) *Attorney, Agent, or Firm* — Jaffery, Watson, Mendonsa & Hamilton LLP

(57) ABSTRACT

In one example an electronic device comprises at least heat generating component, a heat spreader positioned proximate the at least one heat generating component and a passive radiator cooling device, comprising an enclosure, an active speaker positioned at least partially within the enclosure,
(Continued)

and a passive audio radiator positioned at least partially within the enclosure. Other examples may be described.

10 Claims, 9 Drawing Sheets

(51) Int. Cl.
*H04R 1/28* (2006.01)
*H05K 7/20* (2006.01)
*F04D 33/00* (2006.01)

(52) U.S. Cl.
CPC ...... *H04R 2499/11* (2013.01); *H04R 2499/15* (2013.01)

(58) Field of Classification Search
CPC ............ H05K 7/20218–7/20381; H05K 7/20409–7/20418; H05K 7/20009–7/202; H01L 23/367–23/3677; H01L 23/473; H01L 23/46–23/467; H04R 1/2834; H04R 2499/15
USPC ...... 361/676–678, 679.46–679.54, 688–723, 361/679.49; 165/80.1–80.5, 104.33, 185; 174/15.1–15.3, 16.1–16.3, 547, 548; 257/712–722, E23.088; 24/453, 458–459; 454/184; 312/236
See application file for complete search history.

(56) References Cited

U.S. PATENT DOCUMENTS

| | | | | |
|---|---|---|---|---|
| 6,863,152 B1* | 3/2005 | Sahyoun | ................ | H04R 7/20 181/157 |
| 2005/0030712 A1* | 2/2005 | Faneuf | ............... | H05K 7/20727 361/679.51 |
| 2005/0034477 A1* | 2/2005 | Hu | ................ | B64D 13/00 62/435 |
| 2005/0209740 A1* | 9/2005 | Vann, Jr. | ............ | G05D 23/1906 700/300 |
| 2006/0120039 A1* | 6/2006 | Yuval | ................ | H01L 23/467 361/694 |
| 2006/0207748 A1* | 9/2006 | Hashimoto | ............ | F04D 29/30 165/80.3 |
| 2008/0043436 A1* | 2/2008 | Hung | ................ | G06F 1/20 361/700 |
| 2008/0151501 A1* | 6/2008 | Takasou | ............ | H05K 7/20154 361/697 |
| 2009/0040721 A1* | 2/2009 | Lyon | ................ | G06F 1/20 361/697 |
| 2009/0175003 A1* | 7/2009 | Ali | ................ | G06F 1/203 361/695 |
| 2009/0244843 A1* | 10/2009 | Hirohata | ................ | G06F 1/20 361/696 |
| 2010/0053894 A1* | 3/2010 | Chiriac | ................ | G06F 1/20 361/695 |
| 2010/0157522 A1* | 6/2010 | Refai-Ahmed | ........... | G06F 1/20 361/679.54 |
| 2010/0315780 A1* | 12/2010 | Murakami | ............ | H01L 23/473 361/699 |
| 2011/0149504 A1* | 6/2011 | Wikander | ............... | G06F 1/203 361/679.47 |
| 2012/0002368 A1* | 1/2012 | Broili | ....................... | F04D 17/04 361/679.48 |
| 2012/0155025 A1* | 6/2012 | Bourgeois | ........... | H01M 10/399 361/694 |
| 2013/0145612 A1* | 6/2013 | Busch | ........................ | G06F 1/20 29/601 |
| 2013/0213628 A1* | 8/2013 | Litovsky | ............... | H04R 1/2834 165/185 |
| 2013/0258596 A1* | 10/2013 | Sharaf | ................ | H05K 7/20927 361/702 |
| 2013/0301213 A1* | 11/2013 | Senyk | ..................... | G06F 1/203 361/679.47 |
| 2014/0029782 A1* | 1/2014 | Rayner | ................ | H04R 1/2834 381/386 |
| 2014/0054025 A1* | 2/2014 | DeCarr | .................. | G05D 23/00 165/287 |
| 2014/0064522 A1* | 3/2014 | Litovsky | .................. | H04R 3/00 381/152 |
| 2014/0098488 A1* | 4/2014 | MacDonald | ............ | G06F 1/203 361/679.49 |
| 2014/0112371 A1* | 4/2014 | Yang | ........................ | G01K 7/00 374/163 |
| 2014/0119035 A1* | 5/2014 | Van Bommel | ........ | H01L 33/645 362/382 |
| 2014/0126760 A1* | 5/2014 | Tse | ........................... | H04R 5/02 381/334 |
| 2014/0185240 A1* | 7/2014 | MacDonald | ........... | G06F 1/203 361/701 |
| 2014/0193005 A1* | 7/2014 | Riggs | ....................... | H04R 5/02 381/300 |
| 2014/0204534 A1* | 7/2014 | Choudhury | ............ | G06F 1/206 361/702 |
| 2015/0245122 A1* | 8/2015 | Rayner | ................ | H04R 1/2834 381/152 |
| 2016/0044827 A1* | 2/2016 | Proctor | .............. | H05K 7/20127 361/692 |
| 2016/0088775 A1* | 3/2016 | Bailey | .................. | B21D 53/022 361/679.47 |
| 2016/0337748 A1* | 11/2016 | Goksel | ................ | H04R 1/2896 |
| 2016/0353198 A1* | 12/2016 | Sahyoun | ............... | H04R 1/2834 |
| 2017/0041708 A1* | 2/2017 | Barzen | ..................... | H04R 3/06 |
| 2017/0164114 A1* | 6/2017 | Guenther | ............. | H04R 1/2819 |
| 2017/0208389 A1* | 7/2017 | Proni | .................... | H04R 1/2834 |
| 2017/0294694 A1* | 10/2017 | Tso | ..................... | H01M 10/615 |
| 2017/0353787 A1* | 12/2017 | Gunness | ............... | H04R 1/2842 |

OTHER PUBLICATIONS

International Preliminary Report on Patentability received for International Application No. PCT/CN2014/087671, dated Apr. 6, 2017, 6 pages.

\* cited by examiner

FIG. 1  Electronic Device 100

PASSIVE RADIATOR COOLING FOR ELECTRONIC DEVICES

RELATED APPLICATIONS

The present application is a national stage application under 35 U.S.C. § 371 of International Application No. PCT/CN2014/087671 filed on Sep. 28, 2014. Said Application No. PCT/CN2014/087671 is hereby incorporated herein by reference in its entirety.

BACKGROUND

The subject matter described herein relates generally to the field of electronic devices and more particularly to passive radiator cooling for electronic devices.

Electronic devices such as laptop computers, tablet computing devices, electronic readers, mobile phones, and the like include electrical components which generate heat. This heat must be dissipated to prevent the electronic device from overheating. Thus, techniques to dissipate heat in electronic devices may find utility.

BRIEF DESCRIPTION OF THE DRAWINGS

The detailed description is described with reference to the accompanying figures.

DETAILED DESCRIPTION

Described herein are exemplary systems and methods to implement a passive radiator cooling in electronic devices. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the particular examples.

As described above, it may be useful to provide electronic devices with techniques to dissipate heat from the housing of the electronic device. Conventionally, laptop computers have used fans or blower assemblies to dissipate heat by convection. However, many small thin and/or form-factor electronic devices lack space for a fan or blower assembly. Accordingly, other techniques to dissipate heat from such electronic devices may find utility.

The subject matter described herein addresses these and other issues by utilizing a passive radiator device to generate airflow in a specially designed cavity in an electronic device.

Figure 1:
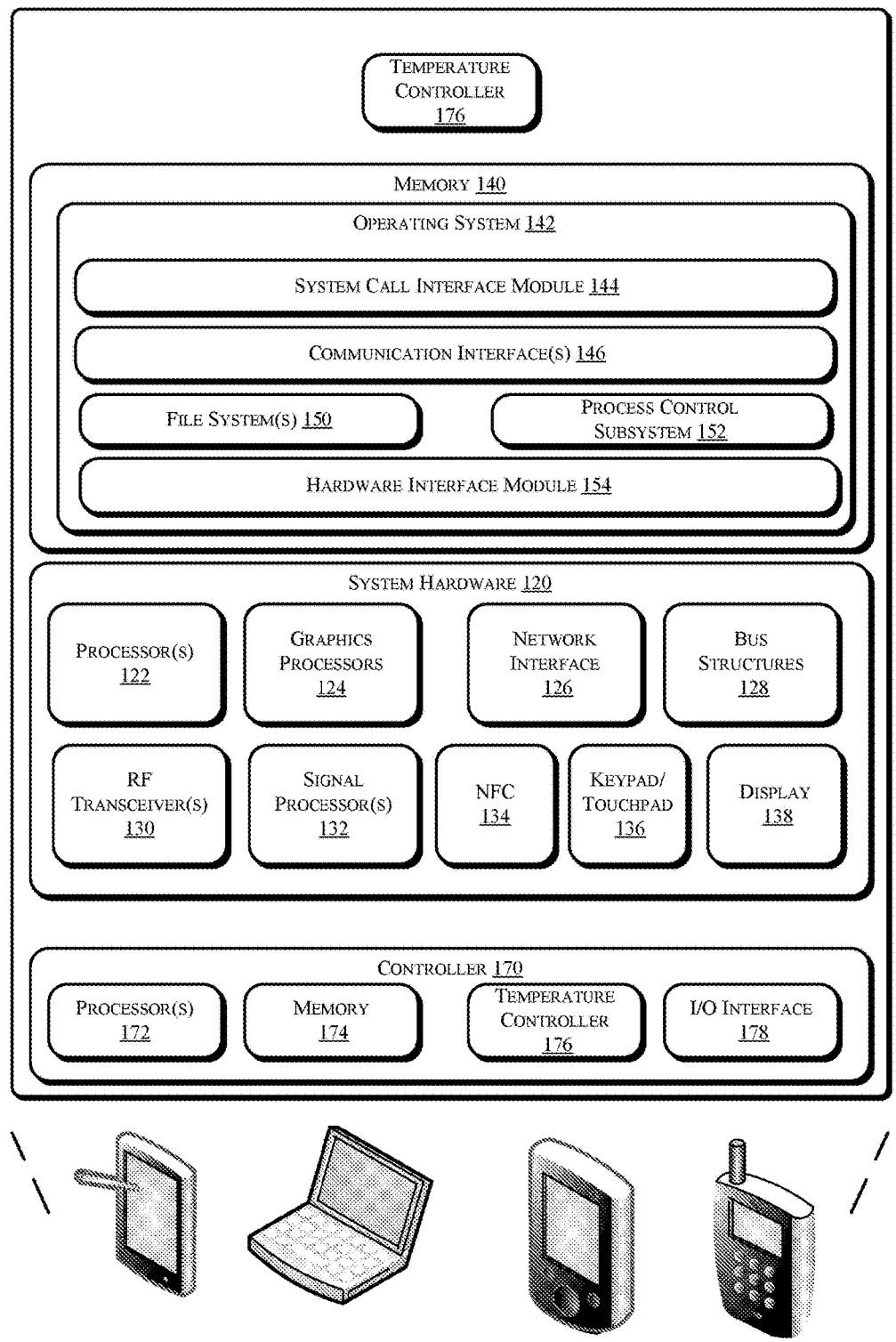
FIGS. 1-2 are schematic illustrations of an electronic device which may be adapted to include a passive radiator cooling in accordance with some examples.

FIG. 1 is a schematic illustration of an electronic device 100 which may be adapted to include passive radiator cooling in accordance with some examples. In various examples, electronic device 100 may include or be coupled to one or more accompanying input/output devices including a display, one or more speakers, a keyboard, one or more other I/O device(s), a mouse, a camera, or the like. Other exemplary I/O device(s) may include a touch screen, a voice-activated input device, a track ball, a geolocation device, an accelerometer/gyroscope, biometric feature input devices, and any other device that allows the electronic device 100 to receive input from a user.

The electronic device 100 includes system hardware 120 and memory 140, which may be implemented as random access memory and/or read-only memory. A file store may be communicatively coupled to electronic device 100. The file store may be internal to electronic device 100 such as, e.g., eMMC, SSD, one or more hard drives, or other types of storage devices. Alternatively, the file store may also be external to electronic device 100 such as, e.g., one or more external hard drives, network attached storage, or a separate storage network.

System hardware 120 may include one or more processors 122, graphics processors 124, network interfaces 126, and bus structures 128. In one embodiment, processor 122 may be embodied as an Intel® Atom™ processors, Intel® Atom™ based System-on-a-Chip (SOC) or Intel® Core2 Duo® or i3/i5/i7 series processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 124 may function as adjunct processor that manages graphics and/or video operations. Graphics processor(s) 124 may be integrated onto the motherboard of electronic device 100 or may be coupled via an expansion slot on the motherboard or may be located on the same die or same package as the Processing Unit.

In one embodiment, network interface 126 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 128 connect various components of system hardware 128. In one embodiment, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI), a High Speed Synchronous Serial Interface (HSI), a Serial Low-power Inter-chip Media Bus (SLIMbus®), or the like.

Electronic device 100 may include an RF transceiver 130 to transceive RF signals, a Near Field Communication (NFC) radio 134, and a signal processing module 132 to process signals received by RF transceiver 130. RF transceiver may implement a local wireless connection via a protocol such as, e.g., Bluetooth or 802.11X. IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a WCDMA, LTE, general packet radio service (GPRS) interface (see, e.g., Guidelines on GPRS Handset Requirements, Global System for Mobile Communications/GSM Association, Ver. 3.0.1, December 2002).

Electronic device 100 may further include one or more input/output interfaces such as, e.g., a keypad 136 and a display 138. In some examples electronic device 100 may not have a keypad and use the touch panel for input.

Memory 140 may include an operating system 142 for managing operations of electronic device 100. In one embodiment, operating system 142 includes a hardware interface module 154 that provides an interface to system hardware 120. In addition, operating system 140 may include a file system 150 that manages files used in the operation of electronic device 100 and a process control subsystem 152 that manages processes executing on electronic device 100.

Operating system 142 may include (or manage) one or more communication interfaces 146 that may operate in conjunction with system hardware 120 to transceive data packets and/or data streams from a remote source. Operating system 142 may further include a system call interface module 144 that provides an interface between the operating system 142 and one or more application modules resident in memory 130. Operating system 142 may be embodied as a UNIX operating system or any derivative thereof (e.g., Linux, Android, etc.) or as a Windows® brand operating system, or other operating systems.

In some examples an electronic device may include a controller 170, which may comprise one or more controllers that are separate from the primary execution environment. The separation may be physical in the sense that the controller may be implemented in controllers which are physically separate from the main processors. Alternatively, the trusted execution environment may logical in the sense that the controller may be hosted on same chip or chipset that hosts the main processors.

By way of example, in some examples the controller 170 may be implemented as an independent integrated circuit located on the motherboard of the electronic device 100, e.g., as a dedicated processor block on the same SOC die. In other examples the trusted execution engine may be implemented on a portion of the processor(s) 122 that is segregated from the rest of the processor(s) using hardware enforced mechanisms In the embodiment depicted in FIG. 1 the controller 170 comprises a processor 172, a memory module 174, a temperature controller 176, and an I/O interface 178. In some examples the memory module 174 may comprise a persistent flash memory module and the various functional modules may be implemented as logic instructions encoded in the persistent memory module, e.g., firmware or software. The I/O module 178 may comprise a serial I/O module or a parallel I/O module. Because the controller 170 is separate from the main processor(s) 122 and operating system 142, the controller 170 may be made secure, i.e., inaccessible to hackers who typically mount software attacks from the host processor 122. In some examples portions of the temperature controller 176 may reside in the memory 140 of electronic device 100 and may be executable on one or more of the processors 122.

Figure 2:
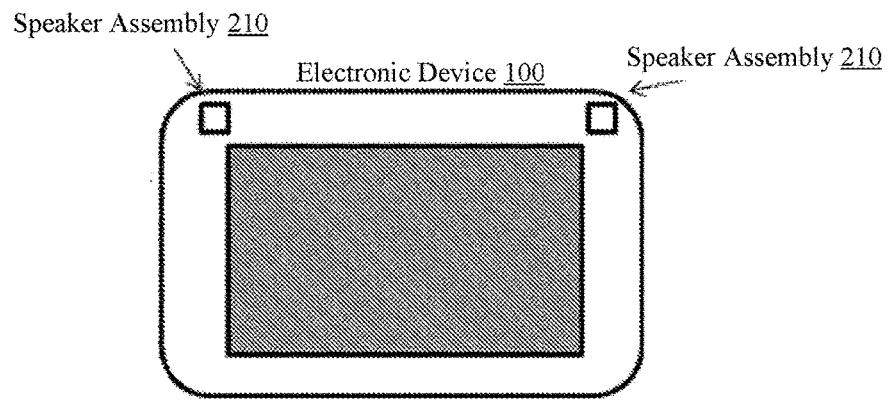

FIG. 2 is a schematic illustration of an electronic device adapted to include passive radiator cooling in accordance with some examples. Referring to FIG. 2, in some embodiments the electronic device 100 comprises at least one speaker assembly 210, and in the device depicted in FIG. 2 comprises two speaker assemblies 210. One skilled in the art will recognize that electronic device 100 may comprise more than two speaker assemblies.

Figure 3:
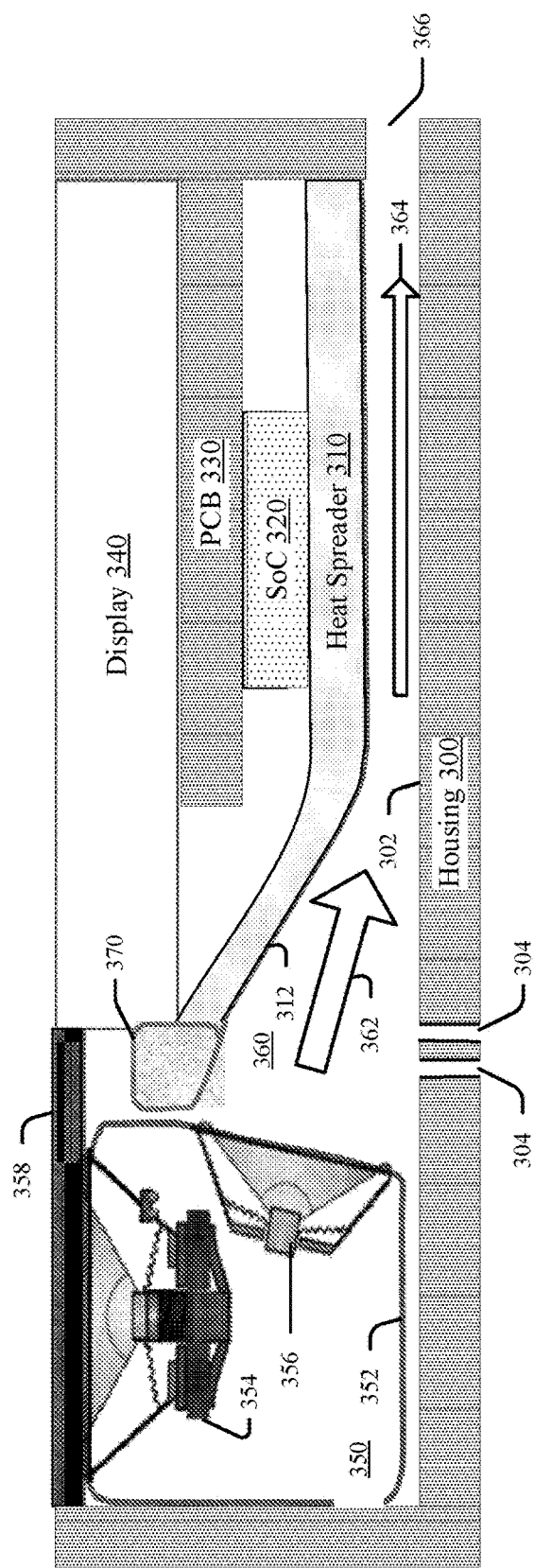
FIG. 3 is a high-level schematic illustration of an exemplary architecture of a housing for an electronic device which implements a passive radiator cooling in accordance with some examples.

FIG. 3 is a high-level schematic illustration of an exemplary architecture of an electronic device which implements a passive radiator cooling in accordance with some examples. Referring to FIG. 3, in some examples an electronic device 100 comprises a housing 300 which encloses the electronic device 100. Electronic device 100 may further comprise one or more heat-generating components such as a processing device, e.g., a system on a chip (SoC) 320, mounted on a printed circuit board (PCB) 330 and a display 340. A heat spreader 310 is positioned proximate at least one heat generating component such as the SoC 320 to conduct heat away from SoC 320.

Electronic device 100 further comprises a passive radiator cooling device 350, which comprises an enclosure 352, an active speaker 354 positioned at least partially within the enclosure 352, and a passive radiator 356 positioned at least partially within the enclosure 352. In the example depicted in FIG. 3 the active speaker 354 faces a speaker cover 358 while the passive radiator 356 faces sideways with a slight tilt. A foam insulator 370 may be positioned between the heat spreader 310 and the passive radiator cooling device 350.

In the example depicted in FIG. 3, the heat spreader 310 is configured to define a cavity 360 within the housing through which air can flow. The cavity comprises a first wall 312 defined by the heat spreader 310 and a second wall 302 defined by an exterior wall 302 of the housing 300. The exterior wall 302 of the housing 300 comprises at least one air inlet passage 304 proximate the first section 362 of the cavity 360. The cavity 360 may be considered to have a first section proximate the passive radiator 356 indicated by airflow arrow 362 and a second section indicated by airflow arrow 364. The second section 364 leads to an air outlet 366 through which air can be expelled from the housing 300. The first section 362 of the cavity 360 has a volume which decreases progressively as a distance from the passive radiator 356 increases. By contrast, the second section 364 of the cavity 360 has a volume which is substantially constant.

In some examples passive radiator cooling device 350 may correspond to the speaker assemblies 210 depicted in FIG. 2. In operation, the active speaker 354 may be driven by circuitry in the electronic device to produce audio output. The operation of the active speaker 354 results in air disturbances in the enclosure 350, which in turn drives the passive radiator 356. In this regard, the passive radiator 356 may be considered to be driven parasitically by the active speaker 354. The parasitic operation of the passive radiator 356 generates an airflow in the cavity in the directions indicated by arrows 362 and 364. Air is drawn into the cavity from air inlet passages 304 and exits the cavity through air outlet 366. This airflow helps to remove heat from heat spreader 310 by convection out the air outlet 366.

As described above, the first section 362 of the cavity reduces in volume as the distance from the passive radiator 356 increases. As the volume of the cavity decreases the air pressure increases, resulting in an increased velocity of the airflow through the second section 364 of the cavity 360.

Figure 4:
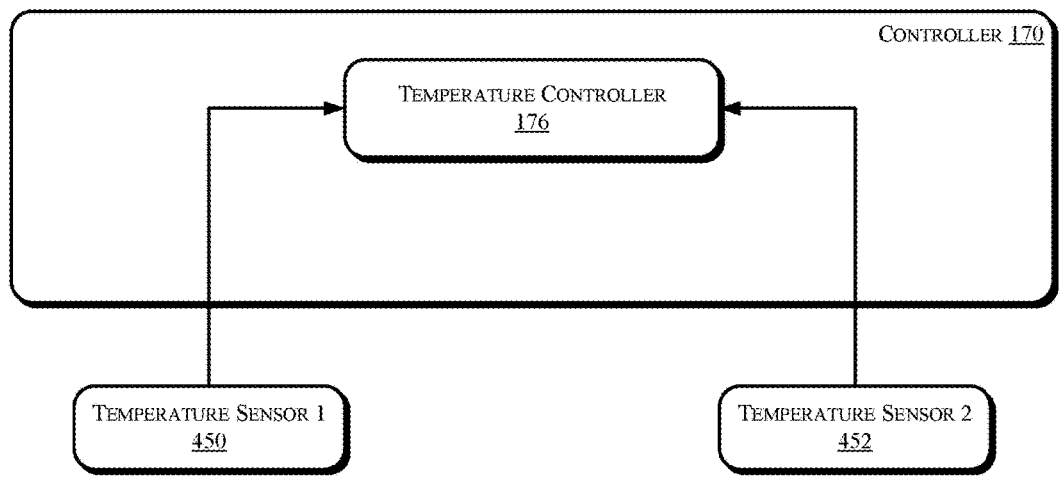
FIG. 4 is a schematic illustration of components of a housing for an electronic device which includes a passive radiator cooling in accordance with some examples.
Figure 5:
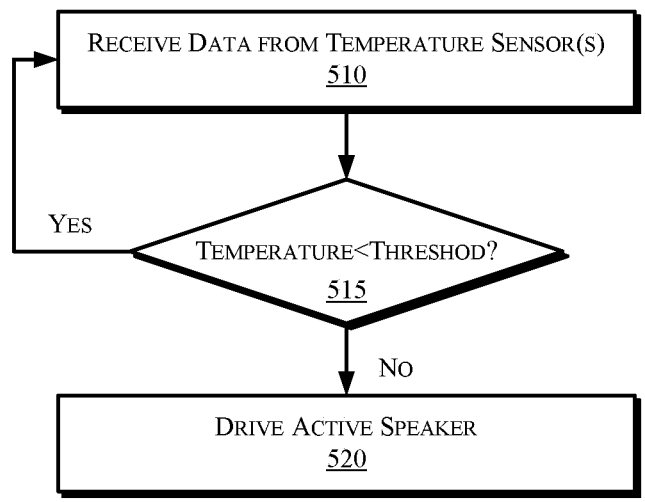
FIG. 5 is a flowchart illustrating operations in a method to implement a passive radiator cooling in accordance with some examples.

In some examples the temperature controller 176 may cooperate with other components of the electronic device 100 to facilitate cooling of the electronic device 100. Referring to FIGS. 4-5, in some examples the temperature controller 176 may be communicatively coupled to one or more temperature sensors 450, 452 positioned within electronic device 100. By way of example, temperature sensors 450, 452 may be embodied as thermistors, thermocouples, or the like and may be positioned on the PCB 330 or proximate (or integrated into) SoC 320.

Referring to FIG. 5, in some examples the temperature controller 176 may receive data from temperature sensors 450, 452 (operation 510). If, at operation 515 the temperature detected by the temperature sensors 450, 452 is less than a threshold value then control passes back to operation 510 and the temperature controller 176 continues to monitor the data from temperature sensors 450, 452. By contrast, if at operation 515 the temperature detected by temperature sensors 450, 452 is not less than a threshold then control passes to operation 520 and the temperature controller 176 initiates a process to drive the active speaker 354. In some examples the temperature controller 176 drives the active speaker 354 at a frequency that is either beneath the audible range of human hearing, the lower limit of which is commonly designated at 15-20 Hz, or above the audible range of hearing, which is commonly designated as 100-200 Hz. Thus, the temperature controller 176 may enlist the passive radiator cooling device 350 to cool the electronic device when the active speaker is not being driven to produce sound that is audible to humans.

Figure 6:
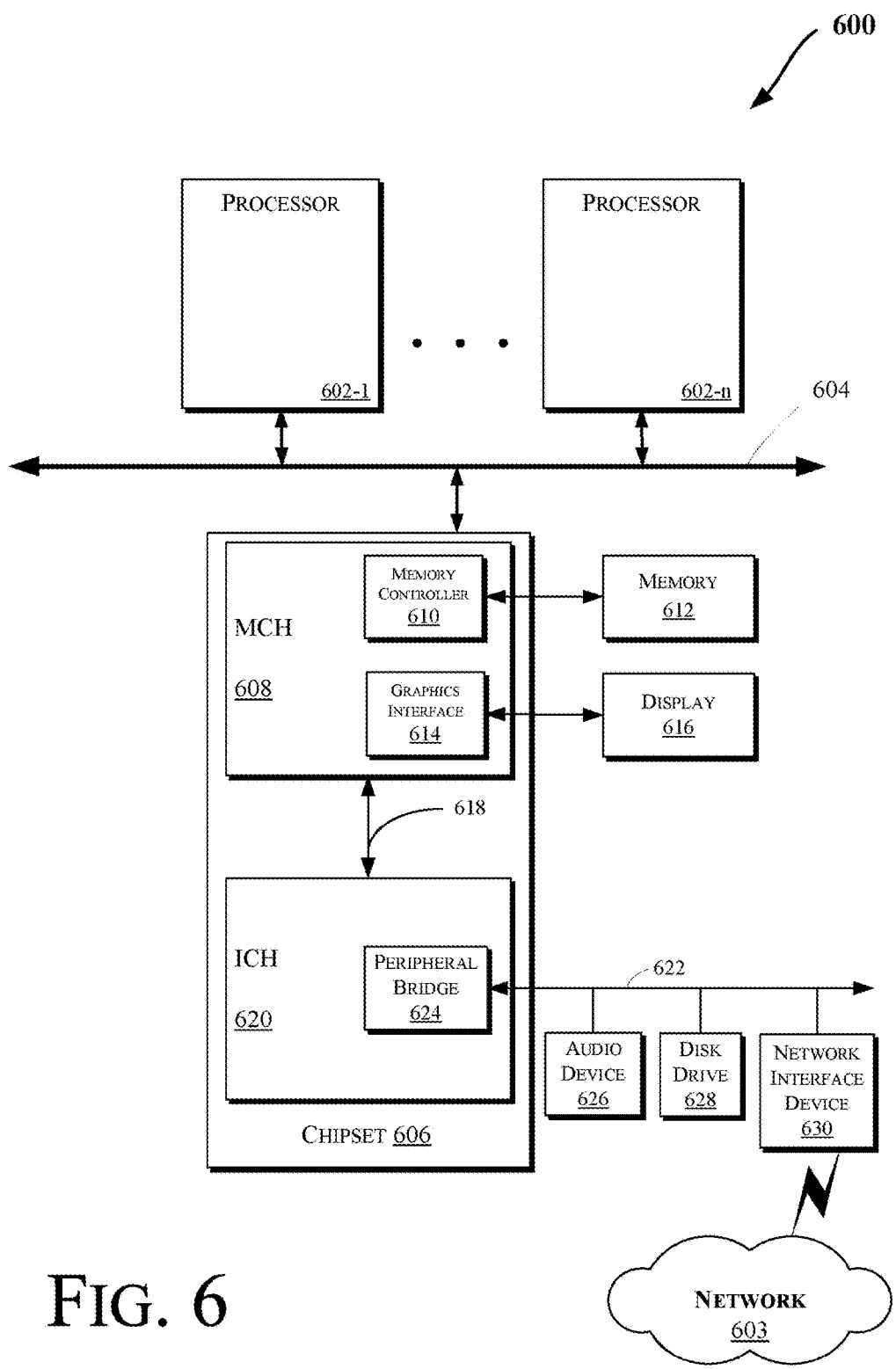
FIGS. 6-10 are schematic illustrations of electronic devices which may be adapted to implement smart frame toggling in accordance with some examples.

As described above, in some examples the electronic device may be embodied as a computer system. FIG. 6 illustrates a block diagram of a computing system 600 in accordance with an example. The computing system 600 may include one or more central processing unit(s) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an example, one or more of the processors 602 may be the same or similar to the processors 102 of FIG. 1. For example, one or more of the processors 602 may include the control unit 120 discussed with reference to FIGS. 1-3. Also, the operations discussed with reference to FIGS. 3-5 may be performed by one or more components of the system 600.

A chipset 606 may also communicate with the interconnection network 604. The chipset 606 may include a memory control hub (MCH) 608. The MCH 608 may include a memory controller 610 that communicates with a memory 612 (which may be the same or similar to the memory 130 of FIG. 1). The memory 412 may store data, including sequences of instructions, that may be executed by the processor 602, or any other device included in the computing system 600. In one example, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple processor(s) and/or multiple system memories.

The MCH 608 may also include a graphics interface 614 that communicates with a display device 616. In one example, the graphics interface 614 may communicate with the display device 616 via an accelerated graphics port (AGP). In an example, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the processor 602 and peripheral devices. Other types of topologies may be utilized. Also, multiple buses may communicate with the ICH 620, e.g., through multiple bridges or controllers. Moreover, other peripherals in communication with the ICH 620 may include, in various examples, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some examples. In addition, the processor 602 and one or more other components discussed herein may be combined to form a single chip (e.g., to provide a System on Chip (SOC)). Furthermore, the graphics accelerator 616 may be included within the MCH 608 in other examples.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
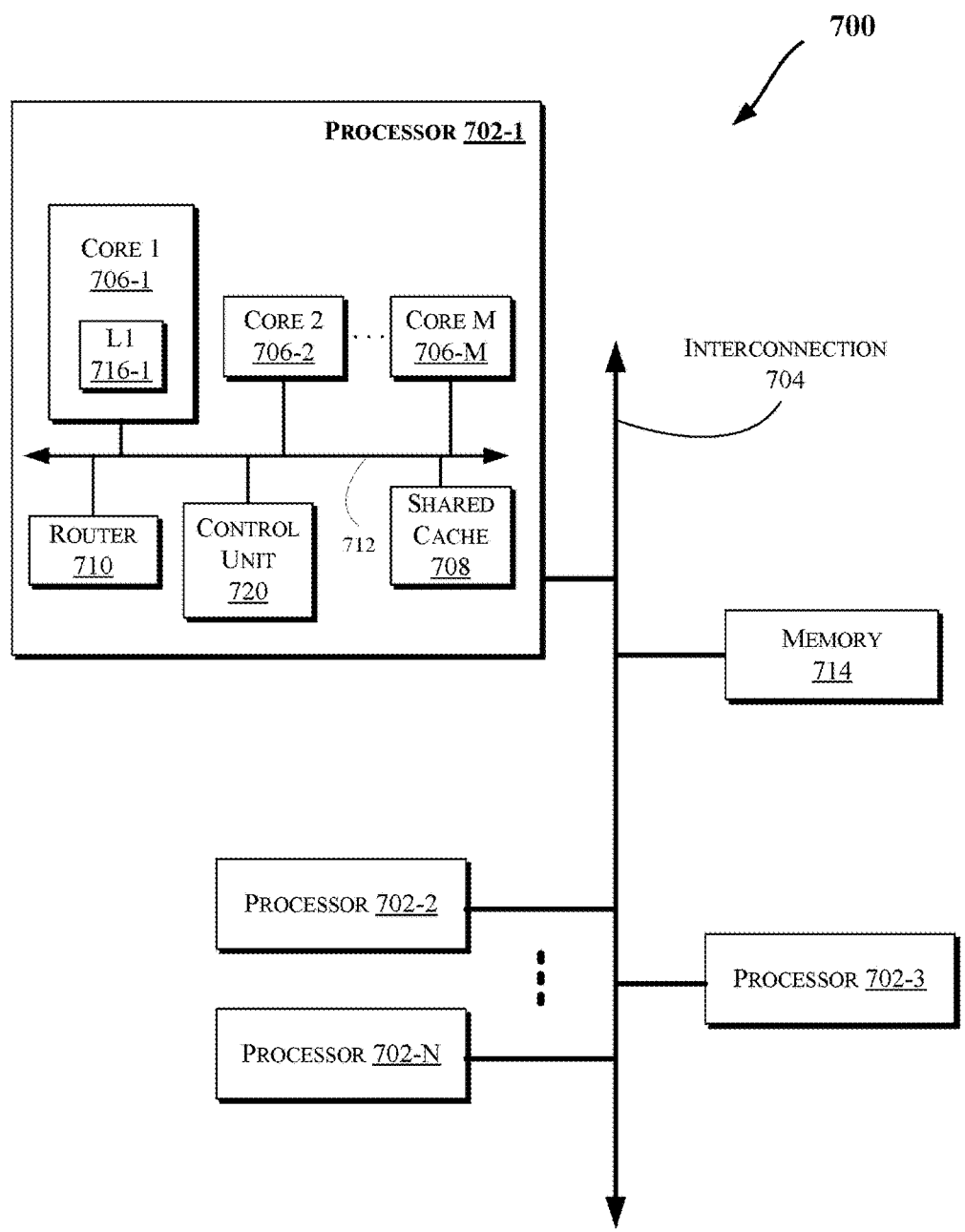

FIG. 7 illustrates a block diagram of a computing system 700, according to an example. The system 700 may include one or more processors 702-1 through 702-N (generally referred to herein as "processors 702" or "processor 702"). The processors 702 may communicate via an interconnection network or bus 704. Each processor may include various components some of which are only discussed with reference to processor 702-1 for clarity. Accordingly, each of the remaining processors 702-2 through 702-N may include the same or similar components discussed with reference to the processor 702-1.

In an example, the processor 702-1 may include one or more processor cores 706-1 through 706-M (referred to herein as "cores 706" or more generally as "core 706"), a shared cache 708, a router 710, and/or a processor control logic or unit 720. The processor cores 706 may be implemented on a single integrated circuit (IC) chip. Moreover, the chip may include one or more shared and/or private caches (such as cache 708), buses or interconnections (such as a bus or interconnection network 712), memory controllers, or other components.

In one example, the router 710 may be used to communicate between various components of the processor 702-1 and/or system 700. Moreover, the processor 702-1 may include more than one router 710. Furthermore, the multitude of routers 710 may be in communication to enable data routing between various components inside or outside of the processor 702-1.

The shared cache 708 may store data (e.g., including instructions) that are utilized by one or more components of the processor 702-1, such as the cores 706. For example, the shared cache 708 may locally cache data stored in a memory 714 for faster access by components of the processor 702. In an example, the cache 708 may include a mid-level cache (such as a level 2 (L2), a level 3 (L3), a level 4 (L4), or other levels of cache), a last level cache (LLC), and/or combinations thereof. Moreover, various components of the processor 702-1 may communicate with the shared cache 708 directly, through a bus (e.g., the bus 712), and/or a memory controller or hub. As shown in FIG. 7, in some examples, one or more of the cores 706 may include a level 1 (L1) cache 716-1 (generally referred to herein as "L1 cache 716"). In one example, the control unit 720 may include logic to implement the operations described above with reference to the memory controller 122 in FIG. 2.

Figure 8:
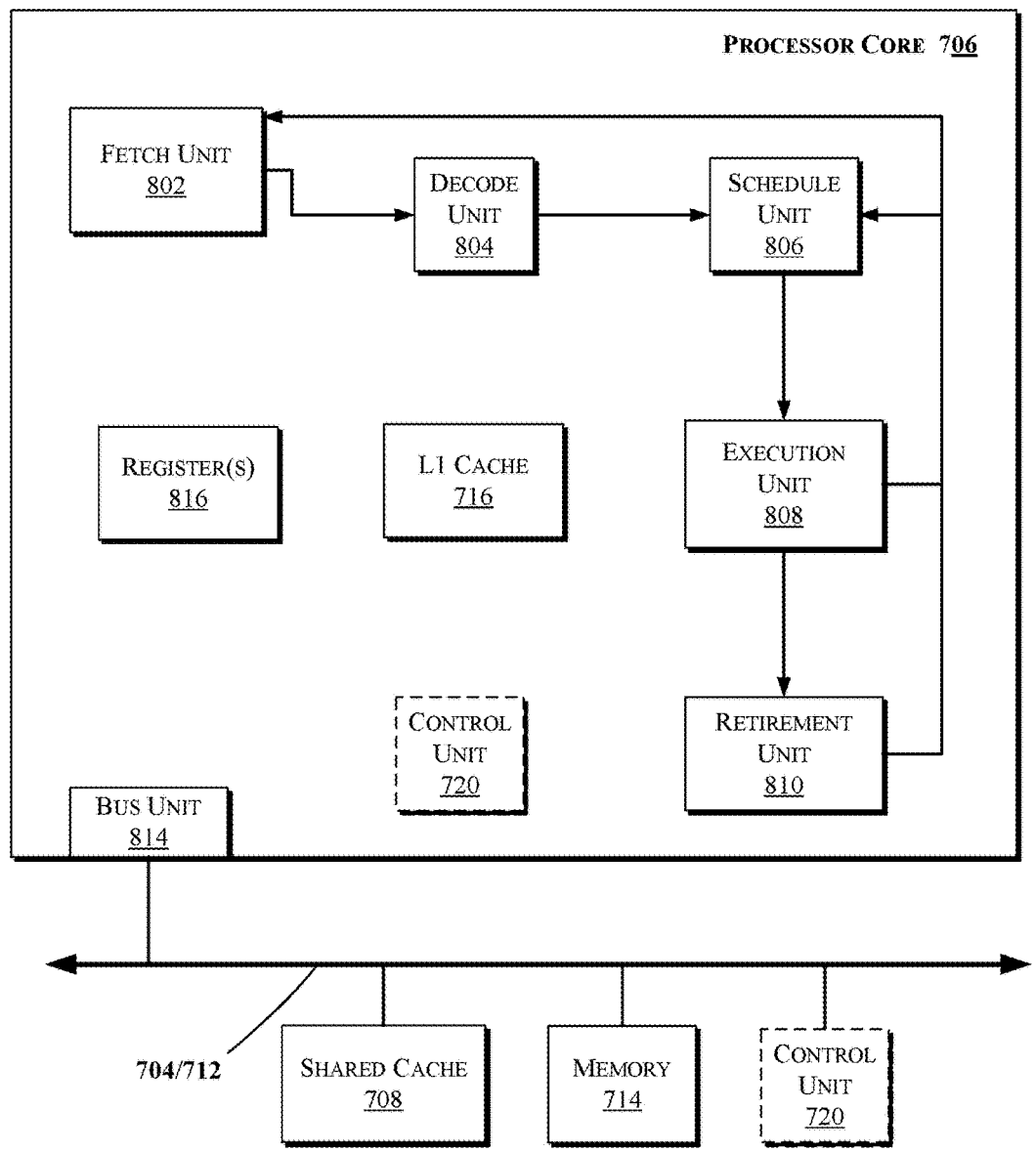

FIG. 8 illustrates a block diagram of portions of a processor core 706 and other components of a computing system, according to an example. In one example, the arrows shown in FIG. 8 illustrate the flow direction of instructions through the core 706. One or more processor cores (such as the processor core 706) may be implemented on a single integrated circuit chip (or die) such as discussed with reference to FIG. 7. Moreover, the chip may include one or more shared and/or private caches (e.g., cache 708 of FIG. 7), interconnections (e.g., interconnections 704 and/or 112 of FIG. 7), control units, memory controllers, or other components.

As illustrated in FIG. 8, the processor core 706 may include a fetch unit 802 to fetch instructions (including instructions with conditional branches) for execution by the core 706. The instructions may be fetched from any storage devices such as the memory 714. The core 706 may also include a decode unit 804 to decode the fetched instruction. For instance, the decode unit 804 may decode the fetched instruction into a plurality of uops (micro-operations).

Additionally, the core 706 may include a schedule unit 806. The schedule unit 806 may perform various operations associated with storing decoded instructions (e.g., received from the decode unit 804) until the instructions are ready for dispatch, e.g., until all source values of a decoded instruction become available. In one example, the schedule unit 806 may schedule and/or issue (or dispatch) decoded instructions to an execution unit 808 for execution. The execution unit 808 may execute the dispatched instructions after they are decoded (e.g., by the decode unit 804) and dispatched (e.g., by the schedule unit 806). In an example, the execution unit 808 may include more than one execution unit. The execution unit 808 may also perform various arithmetic operations such as addition, subtraction, multiplication, and/or division, and may include one or more an arithmetic logic units (ALUs). In an example, a co-processor (not shown) may perform various arithmetic operations in conjunction with the execution unit 808.

Further, the execution unit 808 may execute instructions out-of-order. Hence, the processor core 706 may be an out-of-order processor core in one example. The core 706 may also include a retirement unit 810. The retirement unit 810 may retire executed instructions after they are committed. In an example, retirement of the executed instructions may result in processor state being committed from the execution of the instructions, physical registers used by the instructions being de-allocated, etc.

The core 706 may also include a bus unit 714 to enable communication between components of the processor core 706 and other components (such as the components discussed with reference to FIG. 8) via one or more buses (e.g., buses 804 and/or 812). The core 706 may also include one or more registers 816 to store data accessed by various components of the core 706 (such as values related to power consumption state settings).

Furthermore, even though FIG. 7 illustrates the control unit 720 to be coupled to the core 706 via interconnect 812, in various examples the control unit 720 may be located elsewhere such as inside the core 706, coupled to the core via bus 704, etc.

Figure 9:
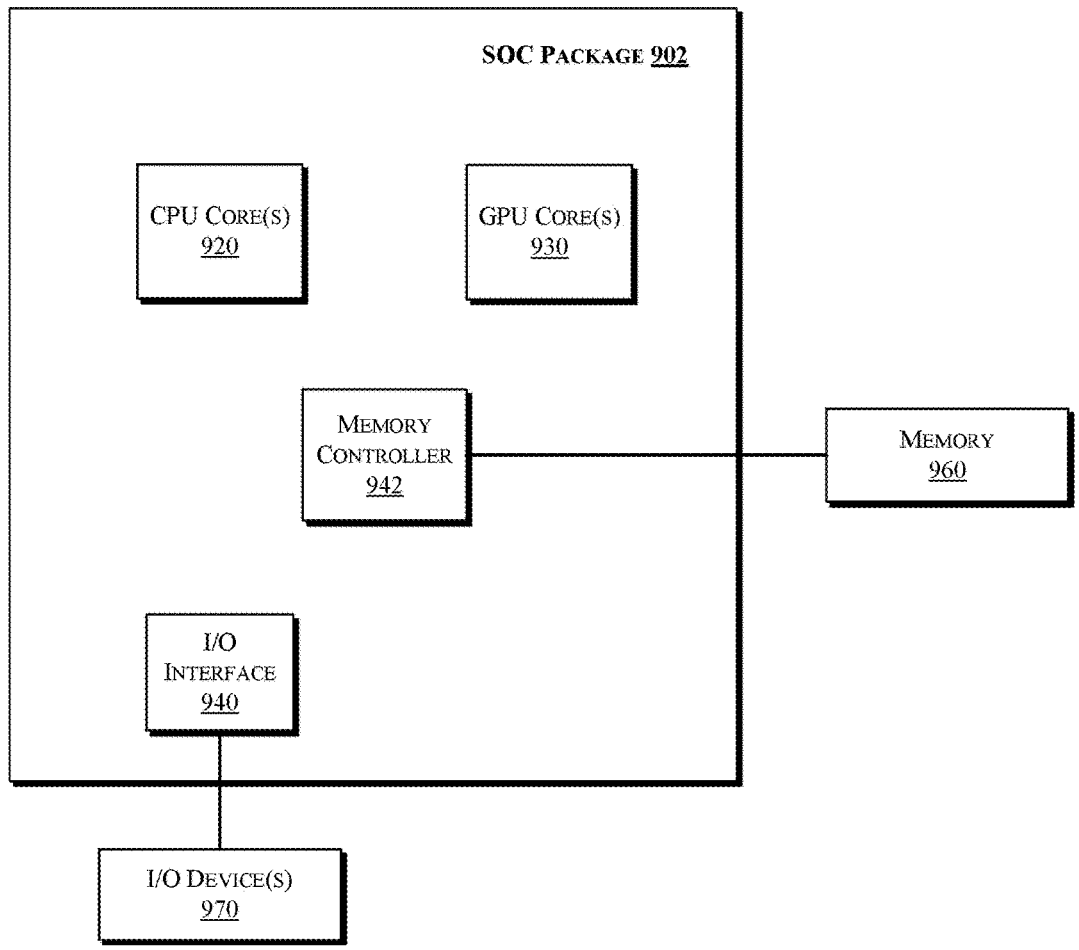

In some examples, one or more of the components discussed herein can be embodied as a System On Chip (SOC) device. FIG. 9 illustrates a block diagram of an SOC package in accordance with an example. As illustrated in FIG. 9, SOC 902 includes one or more processor cores 920, one or more graphics processor cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components, e.g., as discussed with reference to the other figures herein. In one example, SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an example, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device(s) 970 may include one or more of a keyboard, a mouse, a touchpad, a display, an image/video capture device (such as a camera or camcorder/video recorder), a touch surface, a speaker, or the like.

Figure 10:
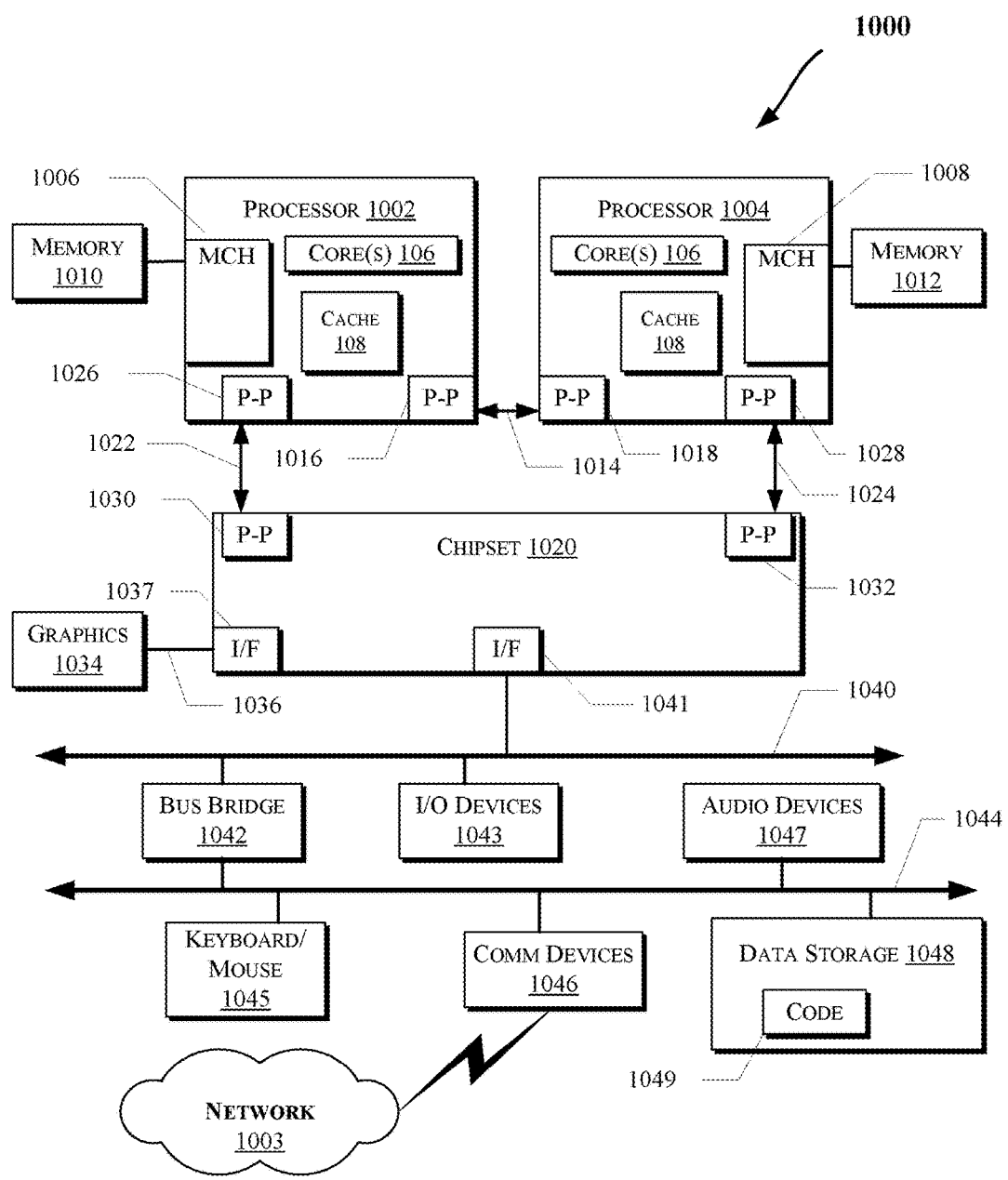

FIG. 10 illustrates a computing system 1000 that is arranged in a point-to-point (PtP) configuration, according to an example. In particular, FIG. 10 shows a system where processors, memory, and input/output devices are interconnected by a number of point-to-point interfaces. The operations discussed with reference to FIG. 2 may be performed by one or more components of the system 1000.

As illustrated in FIG. 10, the system 1000 may include several processors, of which only two, processors 1002 and 1004 are shown for clarity. The processors 1002 and 1004 may each include a local memory controller hub (MCH) 1006 and 1008 to enable communication with memories 1010 and 1012. MCH 1006 and 1008 may include the memory controller 120 and/or logic 125 of FIG. 1 in some examples.

In an example, the processors 1002 and 1004 may be one of the processors 702 discussed with reference to FIG. 7. The processors 1002 and 1004 may exchange data via a point-to-point (PtP) interface 1014 using PtP interface circuits 1016 and 1018, respectively. Also, the processors 1002 and 1004 may each exchange data with a chipset 1020 via individual PtP interfaces 1022 and 1024 using point-to-point interface circuits 1026, 1028, 1030, and 1032. The chipset 1020 may further exchange data with a high-performance graphics circuit 1034 via a high-performance graphics interface 1036, e.g., using a PtP interface circuit 1037.

As shown in FIG. 10, one or more of the cores 106 and/or cache 108 of FIG. 1 may be located within the processors 1004. Other examples, however, may exist in other circuits, logic units, or devices within the system 1000 of FIG. 10. Furthermore, other examples may be distributed throughout several circuits, logic units, or devices illustrated in FIG. 10.

The chipset 1020 may communicate with a bus 1040 using a PtP interface circuit 1041. The bus 1040 may have one or more devices that communicate with it, such as a bus bridge 1042 and I/O devices 1043. Via a bus 1044, the bus bridge 1043 may communicate with other devices such as a keyboard/mouse 1045, communication devices 1046 (such as modems, network interface devices, or other communication devices that may communicate with the computer network 1003), audio I/O device, and/or a data storage device 1048. The data storage device 1048 (which may be a hard disk drive or a NAND flash based solid state drive) may store code 1049 that may be executed by the processors 1004.

The following examples pertain to further examples.

Example 1 is a housing for an electronic device, comprising a heat spreader positioned proximate at least one heat generating component and a passive radiator cooling device, comprising an enclosure, an active speaker positioned at least partially within the enclosure, and a passive radiator positioned at least partially within the enclosure.

In Example 2, the subject matter of Example 1 can optionally include a processing device.

In Example 3, the subject matter of any one of Examples 1-2 can optionally include an arrangement in which the heat spreader is configured to define a cavity within the housing through which air can flow.

In Example 4, the subject matter of any one of Examples 1-3 can optionally include an arrangement in which the cavity comprises a first section proximate the passive radiator and a second section which leads to an air outlet through which air can be expelled from the housing.

In Example 5, the subject matter of any one of Example 1-4 can optionally include an arrangement in which the first section of the cavity has a volume which decreases progressively as a distance from the passive radiator increases.

In Example 6, the subject matter of any one of Example 1-5 can optionally include an arrangement in which the second section of the cavity has a volume which is substantially constant.

In Example 7, the subject matter of any one of Example 1-6 can optionally include an arrangement in which the cavity comprises a first wall defined by the heat spreader and a second wall defined by an exterior wall of the housing.

In Example 8, the subject matter of any one of Example 1-7 can optionally include an arrangement in which the exterior wall of the housing comprises at least one air inlet passage proximate the first section of the cavity.

In Example 9, the subject matter of any one of Example 1-8 can optionally include logic, at least partly including hardware logic, to activate the passive radiator cooling device when a temperature in the housing exceeds a threshold.

In Example 10, the subject matter of any one of Example 1-9 can optionally include logic, at least partially including hardware logic, configured to drive the active speaker at a frequency that is outside a range that is audible to a human.

Example 11 is an electronic device, comprising at least one heat generating component, a heat spreader positioned proximate at least one heat generating component and a passive radiator cooling device, comprising an enclosure, an active speaker positioned at least partially within the enclosure, and a passive radiator positioned at least partially within the enclosure.

In Example 12, the subject matter of Example 11 can optionally include a processing device.

In Example 13, the subject matter of any one of Example 11-12 can optionally include an arrangement in which the heat spreader is configured to define a cavity within the housing through which air can flow.

In Example 14, the subject matter of any one of Example 11-13 can optionally include an arrangement in which the cavity comprises a first section proximate the passive radiator and a second section which leads to an air outlet through which air can be expelled from the housing.

In Example 15, the subject matter of any one of Example 11-14 can optionally include an arrangement in which the first section of the cavity has a volume which decreases progressively as a distance from the passive radiator increases.

In Example 16, the subject matter of any one of Example 11-15 can optionally include an arrangement in which the second section of the cavity has a volume which is substantially constant.

In Example 17, the subject matter of any one of Example 11-16 can optionally include an arrangement in which the cavity comprises a first wall defined by the heat spreader and a second wall defined by an exterior wall of the housing.

In Example 18, the subject matter of any one of Example 11-17 can optionally include an arrangement in which the exterior wall of the housing comprises at least one air inlet passage proximate the first section of the cavity.

In Example 19, the subject matter of any one of Example 11-18 can optionally include logic, at least partly including hardware logic, to activate the passive radiator cooling device when a temperature in the housing exceeds a threshold.

In Example 20, the subject matter of any one of Example 11-19 can optionally include logic, at least partially including hardware logic, configured to drive the active speaker at a frequency that is outside a range that is audible to a human.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A housing for an electronic device, comprising:
   a heat spreader positioned proximate at least one heat generating component; and
   a passive radiator cooling device, comprising:
      an enclosure;
      an active speaker positioned at least partially within the enclosure and facing in a first direction; and
      a passive radiator positioned at least partially within the enclosure to be driven by the active radiator,
   wherein:
      the heat spreader is configured to define a first wall of a cavity within the housing through which air can flow;
      a second wall of the cavity is defined by an exterior wall of the housing;
      the passive radiator is positioned to radiate energy in a second direction, different from the first direction, and into the cavity;
      the cavity comprises:
         a first section proximate the passive radiator; and
         a second section which leads to an air outlet through which air can be expelled from the housing;
      the exterior wall of the housing comprises at least one air inlet passage into the first section of the cavity; and
      the first section of the cavity has a volume which decreases progressively as a distance from the passive radiator increases.

2. The housing of claim 1, wherein the at least one heat generating component comprises a processing device.

3. The housing of claim 1, wherein the second section of the cavity has a volume which is substantially constant.

4. The housing of claim 1, wherein the electronic device comprises logic, at least partly including hardware logic, to:
   activate the passive radiator cooling device when a temperature in the housing exceeds a threshold.

5. The housing of claim 4, wherein the electronic device comprises logic, at least partly including hardware logic, to:
   drive the active speaker at a frequency that is outside a range that is audible to a human.

6. An electronic device, comprising:
   at least one heat generating component;
   a heat spreader positioned proximate the at least one heat generating component; and
   a passive radiator cooling device, comprising:
      an enclosure;
      an active speaker positioned at least partially within the enclosure and facing in a first direction; and
      a passive radiator positioned at least partially within the enclosure to be driven by the active radiator,
   wherein:
      the heat spreader is configured to define a first wall of a cavity within the housing through which air can flow;
      a second wall of the cavity is defined by an exterior wall of the housing;
      the passive radiator is positioned to radiate energy in a second direction, different from the first direction, and into the cavity;
      the cavity comprises:
         a first section proximate the passive radiator; and
         a second section which leads to an air outlet through which air can be expelled from the housing;
      the exterior wall of the housing comprises at least one air inlet passage into the first section of the cavity; and
      the first section of the cavity has a volume which decreases progressively as a distance from the passive radiator increases.

7. The electronic device of claim 6, wherein the at least one heat generating component comprises a processing device.

8. The electronic device of claim 6, wherein the first section of the cavity has a volume which decreases progressively as a distance from the passive radiator increases.

9. The electronic device of claim 6, wherein the second section of the cavity has a volume which is substantially constant.

10. The electronic device of claim 6, further comprising logic, at least partially including hardware logic, configured to:

drive the active speaker at a frequency that is outside a range that is audible to a human.

* * * * *